(12) United States Patent
Klockner

(10) Patent No.: US 7,526,298 B2
(45) Date of Patent: Apr. 28, 2009

(54) METHOD AND ARRANGEMENT FOR THE TREATMENT OF SHORT MESSAGE WITH DIRECTORY NUMBER PORTABILITY

(75) Inventor: Hanns-Peter Klockner, Darmstadt (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 10/518,890

(22) PCT Filed: Jun. 26, 2003

(86) PCT No.: PCT/DE03/02136

§ 371 (c)(1),
(2), (4) Date: Mar. 1, 2005

(87) PCT Pub. No.: WO2004/004382

PCT Pub. Date: Jan. 8, 2004

(65) Prior Publication Data

US 2005/0176448 A1    Aug. 11, 2005

(30) Foreign Application Priority Data

Jun. 28, 2002  (DE) ................................. 102 29 208
Jan. 27, 2003  (DE) ................................. 103 03 161

(51) Int. Cl.
*H04Q 7/20*    (2006.01)
(52) U.S. Cl. ............... 455/466; 455/433; 455/412.1
(58) Field of Classification Search ............ 455/466, 455/445, 432.1, 433, 569.1, 412.1, 412.2
See application file for complete search history.

(56) References Cited

U.S. PATENT DOCUMENTS 6,188,887 B1 * 2/2001 Joong et al. ................. 455/417

6,259,925 B1 * 7/2001 Josse ........................... 455/466
6,370,390 B1 * 4/2002 Salin et al. ................... 455/466

(Continued)

FOREIGN PATENT DOCUMENTS

WO    WO 00/38458    6/2000

OTHER PUBLICATIONS

"ETSI EN 301 716 V7.3.1; Digital Cellular Telecommunications Systems (Phase 2+); Support of Mobile Number Portibility (MNP); Technical Realisation; Stage 2" (GSM 03.66 Version 7.3.1 Release 1998); Oct. 2000, pp. 1-71.

(Continued)

*Primary Examiner*—George Eng
*Assistant Examiner*—Khawar Iqbal
(74) *Attorney, Agent, or Firm*—Baker & Daniels LLP

(57) ABSTRACT

The invention concerns a procedure and a structure to handle short messages under phone number portability between multiple telecommunications networks, where the phone numbers do not permit an unambiguous linkage of the user to a specific telecommunication network and where several attempts at delivery of the short messages are normally required. In order to accelerate routing in subsequent attempts at delivery and to avoid unnecessary routing queries, the invention proposes that all or part of the parameters or data associated with the first attempt at delivery, particularly the target information, be preferably stored in the SMSC or the SMS-GMSC in order to be reused, at least in part, in subsequent attempts at delivery.

4 Claims, 1 Drawing Sheet

U.S. PATENT DOCUMENTS

| | | | |
|---|---|---|---|
| 6,611,516 B1* | 8/2003 | Pirkola et al. | 370/352 |
| 6,760,580 B2* | 7/2004 | Robinson et al. | 455/412.2 |
| 6,985,748 B2* | 1/2006 | Knotts | 455/466 |
| 7,113,781 B1* | 9/2006 | Allison et al. | 455/432.1 |
| 2002/0159387 A1* | 10/2002 | Allison et al. | 370/229 |
| 2002/0160780 A1* | 10/2002 | Mukerjee et al. | 455/445 |
| 2003/0013464 A1* | 1/2003 | Jean Henry-Labordere | 455/466 |
| 2003/0229534 A1* | 12/2003 | Frangione et al. | 705/10 |
| 2004/0082332 A1* | 4/2004 | McCann et al. | 455/445 |
| 2005/0192035 A1* | 9/2005 | Jiang | 455/461 |

OTHER PUBLICATIONS

"ETSI TS 100 901 V7.4.0; Digital Cellular Telecommunications Systems (Phase 2+), Technical Realization of the Short Message Service (SMS); (GSM 03.40 Version 7.4.0 Release 1998)"; Dec. 1999, pp. 1-121.

* cited by examiner

METHOD AND ARRANGEMENT FOR THE TREATMENT OF SHORT MESSAGE WITH DIRECTORY NUMBER PORTABILITY

BACKGROUND OF THE INVENTION

The invention deals with a procedure and structure for the processing of short messages under phone number portability in cellular phone systems.

Short messages (SM) as defined in this invention are not limited to SMS (Short Message Service) and/or MMS (Multimedia Messaging Service).

The introduction of phone number portability in cellular phone service, also called mobile number portability (MNP), which also covers the Short Message Service, was required by the regulating authority for telecommunication and postal service (RegTP); this portability is described in principle in ETSI EN 301 716 (GSM 03.66). Based on the experience in actual operation, it is now known that normally several attempts are necessary to deliver an MT-SM (Mobile Terminated Short Message), i.e. a short message (SM) intended for delivery to a mobile terminal. This requires so-called retries, which are in principle identical in procedure to the initial delivery attempt of an MT-SM. However, GSM 03.66 describes generally only the first delivery attempt, but not the additional retries that are normally required. Given the fact that the introduction of MNP has the result that the international cellular user phone number (MSISDN) of a recipient of an MT-SM provides no information regarding the current subscription network; because the user may transfer the MSISDN into a different cellular network (PLMN), the interrogating network must now always request user data first from the subscription network. Prior to delivery of a SM waiting in a SMS center (SMSC), it now needs to retrieve the address of the "visited MSC", i.e. the transfer node of the cellular network currently used by the recipient, from the home register (HLR) of the subscription network and the international cellular user identification (IMSI) of the recipient. This is handled by various procedures that vary in complexity, but that will eventually yield the needed information, such that it is available after all. The sending entity, which is the HLR in the subscription network of the recipient, also sends his calling party address (CgPty address) as the sender's address. However, this is deleted after each delivery attempt of the SM in all currently known procedures. Thus, the SMSC must address the intended HLR again via a so-called MNP-SRF network element (Mobile Number Portability Signaling Relay Function) for each subsequent retry, even in those cases where the HLR is in the own PLMN. This procedure has been used to-date prior to MNP and continues to be used after MNP essentially unchanged, which leads to the inefficiency described above.

It is thus the objective of the invention to describe a procedure for the processing of short messages under phone number portability in cellular networks, where the load on the network elements involved is reduced and the delivery of short messages is accelerated. A structure to handle the procedure is also described.

The objective is solved in the invention by the characteristics of the independent patent claims.

Advantageous embodiments and further improvements of the invention are described in the dependant patent claims.

SUMMARY OF THE INVENTION

According to an embodiment of the invention, the SMSC is designed technically such that it stores the CgPty address of the HLR found during the first attempt at delivery and that it retains this information parallel to the pending SM. During each subsequently required retry, the SMSC is supplied immediately and internally with the target address of the HLR to be queried for the SM to be delivered and that it can thus request the Send Routing Information For SM from the proper HLR through the SS7 channel. This merely requires the addition of a new field in the holding location of the SMSC for pending SM as well as computational instructions to transfer the CgPty address of the HLR into this field. This information may be taken either from the SCCP or MAP component of the SRI for SM response of the queried HLR.

The procedure described here provides for a significant reduction of the load of the MNP-SRF as the central processor for routing and also accelerates the delivery attempt, because the SMSC does not need to perform an IMSI prefixing or internal table look-up, rather allowing for direct routing to the HLR.

This presents significant operational advantages, because there are no additional tables in the SMSC that require maintenance. These would have been necessary in flexible routing (IMSI-MSISDN decoupling) to store and update several hundred additional entries in the SMSC.

In addition, the procedure may be used worldwide by the manufacturers of the SMSC, because MNP is operated essentially in the same manner everywhere, if GSM 03.66 serves as the guide.

Furthermore, the security of the system is enhanced, because of the reduction in traffic that needs to be routed through the MNP-SRF as the bottleneck.

This procedure also may be used internationally and may thus reduce costs, because it is essentially totally independent of the manufacturer (all SMSC operate on the store-and-forward principle).

For example, if a GSM network has a SMSC capacity of about 1000 SM/s with a daily throughput of about 20 million SM, then the reduction in inquiries to the MTP-SRF may be estimated as up to 50%, i.e. a reduction of 10 million each day.

This reduction yields the following advantages in the SS7 network:

Savings in time in connecting for the retry;
Reduced throughput in the MNP-SRF(s), equivalent to savings in procuring licenses;
Fewer SS7 links;
Reduced maintenance requirements in the SMSC; and
More realistic planning for the future of additional HLR for increased traffic.

The SMSC holds all pending SM in the so-called Short Message Handler (SMH), a particular storage location of the SMSC (store and forward principle). The IMSI and the Visited MSC (VMSC) must be determined for each MT-SM prior to its delivery. This is handled by the MAP_Send_Routing_Information_For_SM inquiry. The SMSC needs the corresponding answer to deliver the MT-SM. Because this does not normally succeed on the first attempt, the SMSC needs to repeat this according a set retry scheme, until either the permitted storage time limit is exceeded or the MT-SM has been delivered successfully. The required and previously available storage space must be enlarged by a field of 10 bytes in this example (the maximum length of the calling address signal, HLR-GT, in the extreme case). The SMSC should then enter the mailing address (CgPty address) of the answering HLR into this additional field for all MT-SM in question. Thus, the target information for the subsequent inquiry is already on file for any MT-SM that is still pending delivery. If the MT-SM is successfully delivered during the first attempt at delivery, the SM, including this information, is erased.

The remaining infrastructure in cellular phone networks is not modified by this invention.

BRIEF DESCRIPTION OF THE DRAWING

The following FIGURE describes an embodiment of the invention in more detail. This yields also additional characteristics, advantages and potential uses of the invention.

DETAILED DESCRIPTION

Figure 1:
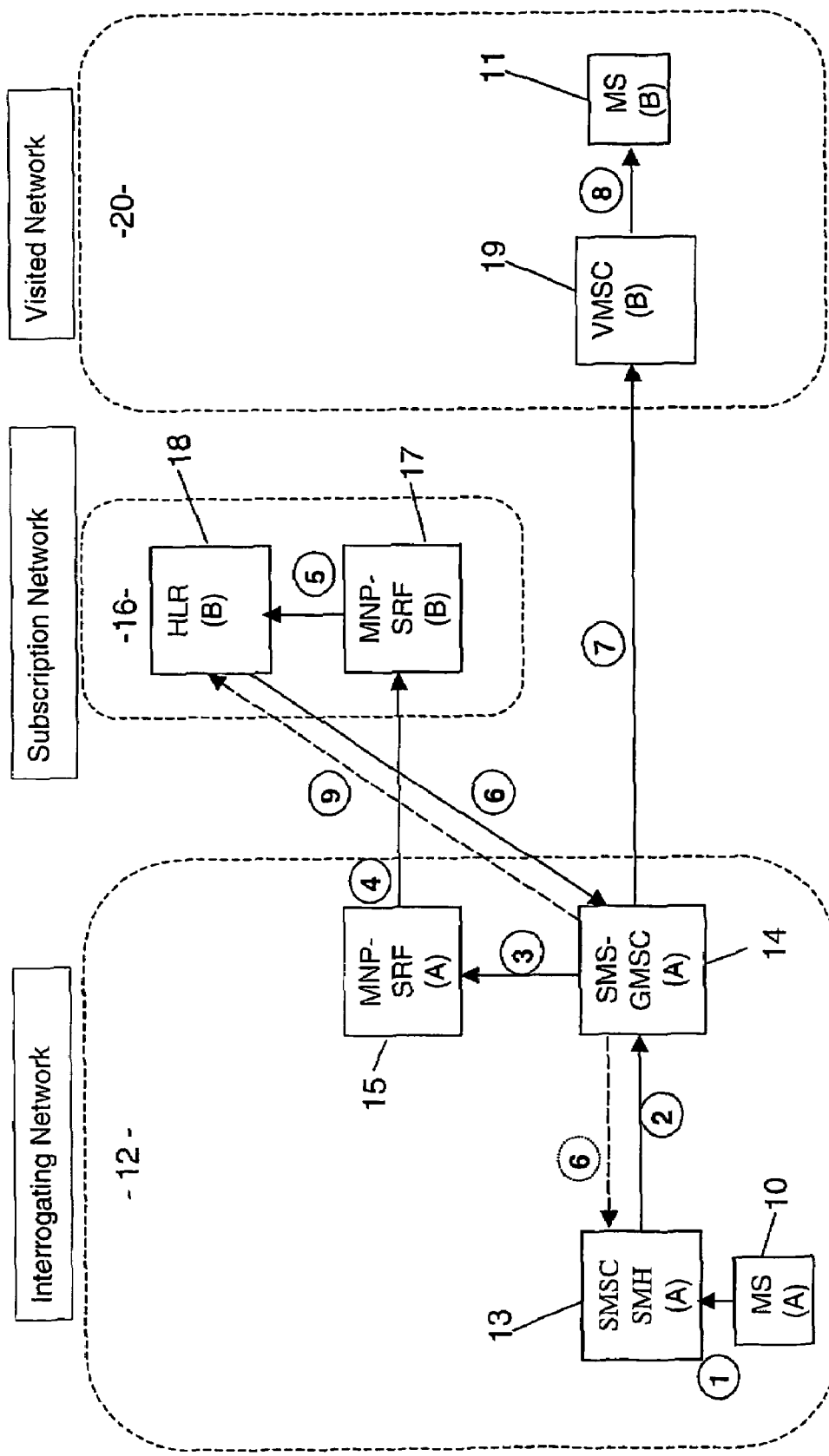
FIG. 1 shows the procedural steps in schematic form that are involved in delivering a short message to a phone number that had been transferred to another network, where the interrogating network supports direct routing.

A cellular phone user 10 wishes to send a short message to another cellular phone user 11. User 10 is a subscriber in interrogating network 12. The short message is received in the SMS center SMSC 13 of network 12 and is stored there temporarily in the storage area of the so-called Short Message Handler (SMH) (step 1). SMSC 13 transfers the short message to the SMS transfer node 14 (step 2). SM-GMSC 14 generates a routing inquiry for delivery of the short message. Thus, a MAP_Send_Routing_Information_For_SM message is sent to the MNP-SRF function 15 of network 12 (step 3). This message contains the MSISDN of the intended recipient 11 as the Called-Party address (CdPty address) and the address of SMS-GMSC 14 as the CgPty address.

Receipt of the message by MNP-SRF 15 triggers an MNP-SRF operation. The MNP-SRF function 15 checks the MSISDN in the CdPty address and determines that the MSISDN had been transferred to another network. This determination may be handled in the known manner by an inquiry to a number portability databases (not shown). The CdPty address is modified on the basis of the data in the NP database and now contains a routing number (RN) or a combination of routing number and MSISDN of recipient 11. The routing number points to subscription network 16 of recipient 11. The MAP Send Routing Information For SM message with the modified CdPty address is sent by MNP-SRF function 15 of network 12 to MNP-SRF function 17 of the subscription network 16 (step 4).

Once MNP-SRF 17 of network 16 has received the message, an additional MNP-SRF operation is triggered. The MNP-SRF function 17 checks the MSISDN in the CdPty address and determines by an inquiry to the NP database that the MSISDN had been transferred to another network. The CdPty address is modified on the basis of the data in the NP database and now contains the address of the relevant home register 18 (HLR) of user 11.

The MAP_Send_Routing_Information_For_SM message with the modified CdPty address is routed to the relevant HLR 18 (step 5).

HLR 18 responds to the routing inquiry by return of a MAP_Send_Routing_Information_For_SM acknowledgment message to MSM-GMSC 14. This message contains the ISMI, as well as normally the address of the transfer node 19 (VMSC) responsible for the recipient, where node 19 is a component of the visited network 20, where the recipient is a subscriber, and also the HLR address of HLR 18 as the CgPty address (step 6).

In the invention, the HLR address transferred to SMS-GMSC 14 is also transmitted to SMSC 13, is added there to the pending short message and is stored in the Short Message Handler.

SMS-GMSC 14 now attempts to deliver the short message to VMSC 19 by means of a Forward_SMS message and the VMSC address (step 7), from where it is forwarded to the user 11 (step 8). If the message is delivered successfully, the short message and the corresponding HLR address in SMSC 13 are erased from SMH storage. If the message was not delivered, delivery will be attempted again after a certain delay (retry).

In each subsequent required retry, SMSC 13 can retrieve the message and the corresponding target address (HLR address) of HLR 18 to be interrogated without delay directly from SMH and to forward them to SMS-GMSC 14. This unit may then immediately request the Send_Routing_Information_For_SM from the relevant HLR 18 via the SS7 channel (step 2, 9, and 6) and then start an attempt at delivery. Thus, the previously required steps 3, 4, and 5 are no longer required in each subsequent attempt at delivery.

The invention claimed is:

1. A system to handle short messages under phone number portability between multiple telecommunications networks, where the phone numbers do not permit an unambiguous linkage of the user to a specific telecommunication network and where several attempts at delivery of the short messages are possible, and where the parameters or data required for delivery of the short message are determined during the first attempt at delivery, said system comprising:

means for determining parameters or data required for the delivery of a short message from a sending entity to a recipient by determining the relevant home register HLR for the recipient through at least one mobile number portability signaling relay function MNP-SRF and then generating a routing inquiry to the relevant HLR;

the relevant HLR including means for responding to the inquiry by returning parameters or data for delivery;

means for performing a first attempt at delivery based on the parameters or data required for delivery;

means for temporarily storing in a short message service center SMSC in the sending network that is involved in the transaction the short message to be delivered and the HLR address of the relevant home register HLR containing the required parameters or data obtained during the first attempt at delivery, the HLR address of the relevant home registrar HLR being stored in an additional HLR address field in the SMSC and being correlated with the short message to be delivered, the correlated relevant HLR address and short message remaining correlated and stored in the SMSC for future delivery in the event delivery is not successful;

in the situation where the short message was not delivered successfully, means for performing at least a subsequent attempt at delivery by retrieving the message and the relevant HLR address which is already stored in the SMSC, and interrogating directly said relevant HLR;

storage space reserved to store all or part of the parameters or data relating to the first attempt at delivery in the short message service center (SMSC) involved in the transaction, where such storage space is associated with a temporary storage location housing the short message to be delivered, and where the relevant HLR address is stored in said temporary storage location for use at least in part in subsequent attempts at delivery; and means for erasing from the short message service center SMSC the short message and the relevant HLR address when the short message is delivered successfully.

2. A method for handling short messages under phone number portability between several communications networks, where the phone numbers do not permit an unambiguous linkage of the user to a specific telecommunication network, comprising the steps of:

determining parameters or data required for the delivery of a short message from a sending entity to a recipient by determining the relevant home register HLR for the recipient and then generating a routing inquiry to the relevant HLR;

the relevant HLR responding to the inquiry by returning parameters or data for delivery;

performing a first attempt at delivery based on the parameters or data required for delivery;

temporarily storing in a short message service center SMSC in the sending network that is involved in the transaction the short message to be delivered and the HLR address of the relevant home register HLR containing the required parameters or data obtained during the first attempt at delivery, the HLR address of the relevant home registrar HLR being stored in an additional HLR address field in the SMSC and being correlated with the short message to be delivered, the correlated relevant HLR address and short message remaining correlated and stored in the SMSC for future delivery in the event delivery is not successful;

if the short message was not delivered successfully, performing at least a subsequent attempt at delivery by retrieving the message and the revelant HLR address which is already stored in the SMSC, and interrogating directly said relevant HLR; and if the short message is delivered successfully, erasing from the short message service center SMSC the short message and the relevant HLR address.

3. The method according to claim 2, characterized by having the query of the HLR use an SS7 channel.

4. A method for handling short messages under phone number portability between several communications networks, where the phone numbers do not permit an unambiguous linkage of the user to a specific telecommunication network, comprising the steps of:

determining parameters or data required for the delivery of a short message from a sending entity to a recipient by determining the relevant home register HLR for the recipient and then generating a routing inquiry to the relevant HLR;

the relevant HLR responding to the inquiry by returning parameters or data for delivery;

performing a first attempt at delivery based on the parameters or data required for delivery;

temporarily storing in a short message service center SMSC in the sending network that is involved in the transaction the short message to be delivered and the HLR address of the relevant home register HLR containing the required parameters or data obtained during the first attempt at delivery, the HLR address of the relevant home registrar HLR being stored in an additional HLR address field in the SMSC and being correlated with the short message to be delivered, the correlated relevant HLR address and short message remaining correlated and stored in the SMSC for future delivery in the event delivery is not successful;

if the short message was not delivered successfully, performing at least a subsequent attempt at delivery by retrieving the message and the relevant HLR address which is already stored in the SMSC, and interrogating directly said relevant HLR;

if the short message is delivered successfully, erasing from the short message service center SMSC the short message and the relevant HLR address;

when performing the first attempt at delivery, transferring the short message to a mobile number portability signaling relay function MNP-SRF network element whereupon an inquiry of one or more databases is conducted to determine the network of the recipient, and sending routing information for the recipient to the relevant HLR; and when performing subsequent attempts at delivery, transfer to the MNP-SRF network element is bypassed and said relevant HLR is interrogated directly.

* * * * *

UNITED STATES PATENT AND TRADEMARK OFFICE
CERTIFICATE OF CORRECTION

PATENT NO.       : 7,526,298 B2                           Page 1 of 1
APPLICATION NO.  : 10/518890
DATED            : April 28, 2009
INVENTOR(S)      : Hanns-Peter Klockner It is certified that error appears in the above-identified patent and that said Letters Patent is hereby corrected as shown below:

Claim 1, Column 4, Line 41, delete "registrar" and insert --register--

Claim 2, Column 5, Line 16, delete "registrar" and insert --register--

Claim 4, Column 6, Line 14, delete "registrar" and insert --register--

Signed and Sealed this

Ninth Day of June, 2009

JOHN DOLL
*Acting Director of the United States Patent and Trademark Office*